United States Patent [19]

Masubuchi

[11] 4,249,801
[45] Feb. 10, 1981

[54] LIQUID CRYSTAL DISPLAY DEVICE

[75] Inventor: Sadao Masubuchi, Musashino, Japan

[73] Assignee: Citizen Watch Company Limited, Tokyo, Japan

[21] Appl. No.: 954,596

[22] Filed: Oct. 25, 1978

[30] Foreign Application Priority Data

Oct. 28, 1977 [JP] Japan ................... 52/129330

[51] Int. Cl.³ .............................................. G02F 1/13
[52] U.S. Cl. ................................. 350/346; 350/338
[58] Field of Search ............... 350/338, 346, 350 R

[56] References Cited

U.S. PATENT DOCUMENTS

| | | | |
|---|---|---|---|
| 3,781,088 | 12/1973 | Tsukamoto et al. ................ | 350/346 |
| 3,792,915 | 2/1974 | Oh et al. ........................... | 350/346 X |
| 3,821,720 | 6/1974 | Greubel et al. .................... | 350/346 X |
| 3,846,014 | 11/1974 | Aldrich et al. .................... | 350/338 |
| 3,984,343 | 10/1976 | Cole et al. ......................... | 350/346 X |

Primary Examiner—Edward S. Bauer
Attorney, Agent, or Firm—Holman & Stern

[57] ABSTRACT

A liquid crystal display device to display information in color, utilizing dichroic and diffusion reflectors. Application of an electric field causes a change from a Grandjean texture of the liquid crystal to a static scattering mode, to effect scattering of light in desired display areas so that these areas are viewed in the reflection color of the dichroic reflector and other areas in the transmission color.

4 Claims, 5 Drawing Figures

LIQUID CRYSTAL DISPLAY DEVICE

This invention relates to liquid crystal display devices for displaying information in color, and in particular to a liquid crystal display device incorporating a dichroic reflector and a liquid crystal material consisting of a mixture of positive dielectric anisotropy nematic material and chiral material.

Liquid crystal display devices are extremely advantageous in a wide variety of electronic equipment, and in particular to portable electronic devices, due to their capability for operating at low drive voltages, and the low level of power consumption required to drive them. This feature of very low power consumption is particularly true for black and white (i.e. non-color) display devices which have been developed up to the present. However liquid crystal display devices that will display information in color are now required. Conventional liquid crystal display devices for this purpose have employed a mixture of negative dielectric anisotropy nematic material and cholesteric material and have been mainly of dynamic scattering type (referred to herein as DS type), in which desired regions of a liquid crystal layer can be made to scatter light which passes therethrough, by putting the liquid crystal molecules into a turbulent condition through applying an electric field. Parts of the liquid crystal to which no electric field is applied permit light to pass without scattering. Light which passes through the liquid crystal layer is transmitted through a partially reflecting dichroic reflector, and reflected by a diffusion reflector, while light which is scattered in the liquid crystal layer is reflected from the dichroic reflector, due to the angle at which the light impinges upon the dichroic reflector, and therefore attains a different color from light which is transmitted through the dichroic reflector. However due to the dynamic scattering mode of operation, a liquid crystal material of relatively low resistivity must be used, so that the power consumption of such a device is high by comparison with other types of liquid crystal display devices.

With a liquid crystal display device in accordance with the present invention, the dynamic scattering mode is not utilized. Instead, the liquid crystal molecules are arranged in a Grandjean texture, i.e. with a helical ordering of the liquid crystal molecules, in which the axes of the helixes are aligned uniformly, in the absence of an electric field. With such a molecular ordering, light is transmitted freely through the liquid crystal without being scattered. When an electric field is applied, the uniform alignment of the helix axes is disrupted, and the liquid crystal material enters a phase change mode in which a number of small domains are formed. These domains cause scattering of light passed through the liquid crystal, as in the case of a dynamic scattering type of device. Since the liquid crystal molecules are not set into a dynamic state of turbulence to achieve this scattering of light, the power consumption of a liquid crystal display device in accordance with the present invention is much lower than that of a dynamic scattering type of device. Arrangement of the liquid crystal molecules in the Grandjean texture is achieved by utilizing a mixture of a nematic liquid crystal material having positive dielectric anisotropy and chiral material, and by utilizing alignment layers on the substrates of the device. It is possible to restore the liquid crystal molecules from the scattering state back to the freely transmitting state by applying a high frequency electric field, or by applying a higher voltage to the device electrodes than that used to achieve the scattering state. However, by using a suitably thin layer of liquid crystal, it is possible to create a liquid crystal display device in accordance with the present invention in which the liquid crystal molecules immediately revert to the Grandjean texture when the voltage applied to the device electrodes is removed. In other words, it is possible to eliminate the memory effect which occurs with cholesteric nematic liquid crystal display devices which utilize the dynamic scattering effect.

It is therefore an object of the present invention to provide a liquid crystal display device for the display of information in color.

More particularly, it is an object of the present invention to provide an improved liquid crystal display device for the display of information in color, whereby the power consumed to drive the device is substantially reduced by comparison with conventional devices of this type.

Further objects, features and advantages of the present invention will be made more apparent from the following description, when taken in conjunction with the accompanying drawings, whose scope is given by the appended claims.

Figure 1:
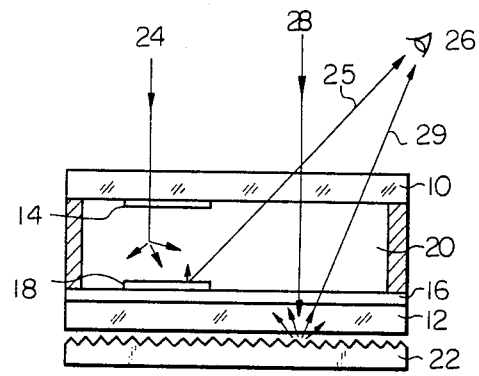
FIG. 1 is a simplified cross-sectional view of a liquid crystal display device of conventional type for displaying information in color, utilizing the dynamic scattering effect.

Referring now to FIG. 1, a simplified cross-sectional view of a conventional type of liquid crystal display device for the display of information in color using a dichroic reflector. Numerals 10 and 12 indicate transparent supporting plates, referred to hereinafter as substrates. A transparent electrode 14 is formed on one face of substrate 10. A dichroic mirror 16 is formed on a face of substrate 12. Dichroic mirror 16 is a partial reflector, and has the property of transmitting different wavelengths of light, depending upon whether the light is reflected from it or is transmitted through it. The color of light reflected from dichroic mirror 16 will be referred to hereinafter as the reflection color, while the color of light transmitted through it will be referred to as the transmission color. A second transparent electrode 18 is formed on a surface of dichroic mirror 16. A thin layer of liquid crystal material 20 is sealed between substrates 10 and 12. A diffusion reflector 22 is arranged as shown, at the opposite side of the device to a source of incident light 24 and 28.

The operation of this device will now be described. Liquid crystal layer 20 consists of a mixture of nematic liquid crystal molecules having negative dielectric anisotropy and cholesteric liquid crystal molecules. In the absence of an electric field being applied by electrodes 14 and 18, the molecules of liquid crystal layer 20 assume a uniform texture. In this state, incident light 28 passes through the liquid crystal layer 20 without being scattered, and therefore impinges upon dichroic mirror 16 at an angle which is close to the normal to the plane of dichroic mirror 16. This light is therefore transmitted through dichroic mirror 16, to be diffused and reflected by diffusion reflector 22. The light then passes again through dichroic mirror 16 and liquid crystal layer 20, along a line such as is indicated by numeral 29, to an observer 26. This light therefore appears to observer 26 in the transmission color of dichroic mirror 16, which constitutes the background color of the display.

If now a voltage of suitable magnitude is applied to electrodes 14 and 18, an electric field is generated between them which causes the liquid crystal molecules to enter a state of strong turbulence, in which a large number of scattering centers are formed. Since this turbulence is caused by conductivity effects in the liquid crystal layer, it is necessary for the liquid crystal to have a negative dielectric anisotropy and to have a relatively low resistivity, of the order of $10^8$ ohm-cm. Since incident light 24 is now scattered upon entering liquid crystal layer 20, much of this light impinges upon dichroic mirror 16 at an angle which is substantially less than 90° with respect to the substrate plane, so that it is reflected from dichroic mirror 16 and reaches observer 26 along a line such as that indicated by numeral 25. This light will therefore appear in the reflection color to observer 26. Thus, the area of liquid crystal layer 20 situated between electrodes 14 and 18 will appear in a different color from the background color (i.e. the transmission color of dichroic mirror 16).

Since a liquid crystal material of relatively low resistivity must be utilized in such a dynamic scattering type of device, the power consumed to drive the device is substantial, by comparison with liquid crystal display devices of other types.

Figure 2:
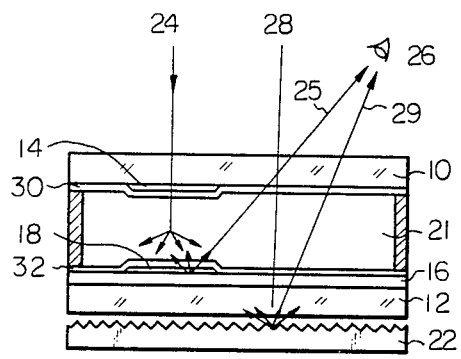
FIG. 2 is a simplified cross-sectional view of an embodiment of a liquid crystal display device in accordance with the present invention.

Referring now to FIG. 2, a liquid crystal display device in accordance with the present invention is shown in simplified cross-section. As in the case of the device in FIG. 1, numerals 10 and 12 indicate transparent substrates, 14 and 18 are transparent electrodes, and a dichroic mirror 16 is formed upon substrate 12, while a diffusion reflector 22 is arranged behind substrate 12. Liquid crystal layer 21 consists of a mixture of nematic liquid crystal molecules having positive dielectric anisotropy and chiral materials such as cholesteric liquid crystal molecules or chiral nematic liquid crystal molecules. In a case where the liquid crystal layer 21 has a thickness in the order of 10 μm, the liquid crystal layer 21 may consist of a positive dielectric anisotropy cholesteric liquid crystal consisting of a mixture of about 99–90% by weight of positive dielectric anisotropy nematic liquid crystal material containing a large proportion of a positive dielectric anisotropy liquid crystal material such as butoxybenzylideneparacyanoaniline and a small proportion of a negative dielectric anisotropy liquid crystal material such as methoxybenzylideneparabutylaniline; and about 1–10% of by weight cholesteryl nonanoate. Alternatively, the liquid crystal layer 21 may preferably consist of a mixture of about 99–80 weight % of positive dielectric anisotropy nematic liquid crystal material containing a large proportion of positive dielectric anisotropy liquid crystal material such as butoxybenzylideneparacyanoaniline and a small proportion of a negative dielectric anisotropy liquid crystal material such as methoxybenzylideneparabutylaniline; and about 1–20% of chiral nematic liquid crystal material such as 2-methylbutyl-4-(4-hexyloxybenzoyloxy)-benzoate. The positive dielectric anisotropy cholesteric liquid crystal is selected to have a relatively high resistivity, of the order of $10^{10}$ ohm-cm. Addition of a small amount of negative dielectric anisotropy nematic liquid crystal to the positive dielectric anisotropy nematic liquid crystal increases the operating temperature range of the display device.

Figure 3:
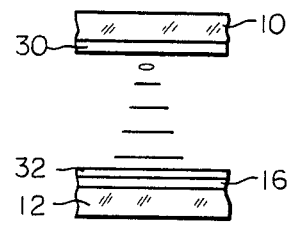
FIG. 3 is a partial simplified cross-sectional view of a liquid crystal display device in accordance with the present invention, indicating one possible orientation of the axes of the helixes of the Grandjean molecular texture.

Alignment layers 30 and 32 are formed over the internal surfaces of substrate 10, and over transparent electrodes 14 and 18, together with portions of dichroic mirror 16 which are not covered by transparent electrode 18. Alignment layers 30 and 32 serve to align the longitudinal axes of adjacent molecules of liquid crystal layer 21 in desired directions. This is illustrated in FIG. 3, in which alignment layer 30 causes the longitudinal axes of adjacent molecules of liquid crystal layer 21 to align in a direction parallel to the substrate plane and normal to the plane of the paper. Alignment layer 32 causes the longitudinal axes of adjacent liquid crystal molecules to align in a direction parallel to the substrate plane and parallel to the plane of the paper, as shown by the lines. Due to the cholesteric liquid crystal molecules incorporated in layer 21, the liquid crystal molecules attain a Grandjean texture. For the particular arrangement of alignment layers and spacing between substrates 10 and 12 shown in FIG. 3, the configuration of each helix in the Grandjean texture will be as shown, with the helix axes being uniformly aligned normal to the substrate plane (I.e. FIG. 3 illustrates one typical helix of the Grandjean texture). However for a liquid crystal display device in accordance with the present invention, it is not necessary that the helix axes be arranged normal to the substrate plane, and the axes can have a uniform alignment parallel to the substrate plane, as will be described later with respect to a modification of the embodiment illustrated in FIG. 2 and FIG. 3.

Due to the molecules of liquid crystal layer 21 being arranged in the manner described above, i.e. in a Grandjean texture with the helix axes aligned normal to the substrate plane, incident light 28 passes through the liquid crystal layer 21 without being scattered, i.e. layer 21 is transparent to light. Most of incident light 28 therefore is diffused by diffusion reflector 22, and is reflected therefrom, passing again through dichroic mirror 16 and liquid crystal layer 21 to observer 26, along line 29. Observer 26 therefore sees this light in the transmission color of dichroic mirror 16, which forms the background color of the display. Although there is a component of incident light 28 which is reflected by dichroic mirror 16 in this condition, this component is not reflected back in such a direction as to be visible to observer 26.

Figure 4:
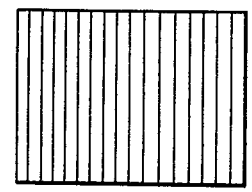
FIG. 4 is a diagram illustrating the appearance of an area of a liquid crystal display device in accordance with the present invention to which an electric field is applied, as viewed under a microscope.

If now a voltage of suitable magnitude is applied to transparent electrodes 14 and 18, creating an electric field between them, the Grandjean structure of the liquid crystal molecules with helix axes aligned normal to the substrate plane is disrupted. The liquid crystal molecules enter focal-conic cholesteric, which is a static scattering state in which light passing through the part of liquid crystal layer 21 between electrodes 14 and 18 is scattered. The scattering is caused by the formation of very small domains, which are visible under the microscope and have the general appearance under the microscope shown in FIG. 4. With a liquid crystal display device in accordance with the present invention, scattering is not achieved by a conduction effect causing turbulence of the liquid crystal molecules, and so liquid crystal having extremely high resistivity (of $10^{10}$ ohm-cm or higher) can be used. The power consumption of a display device in accordance with the present invention is therefore very much lower than that of a dynamic scattering type of display device. Due to this static scattering effect when an electric field is applied between electrodes 14 and 18, incident light 24 is scattered within liquid crystal layer 21, and therefore much of this light meets dichroic mirror 16 at such an angle of incidence that the light is reflected therefrom, along line 25, to observer 26. Observer 26 sees this light in the reflection color of dichroic mirror 16. Thus, by a suitable arrangement of transparent electrodes 14 and 18, information can be displayed in color, against a colored background, with a liquid crystal display device in accordance with the present invention.

Figure 5:
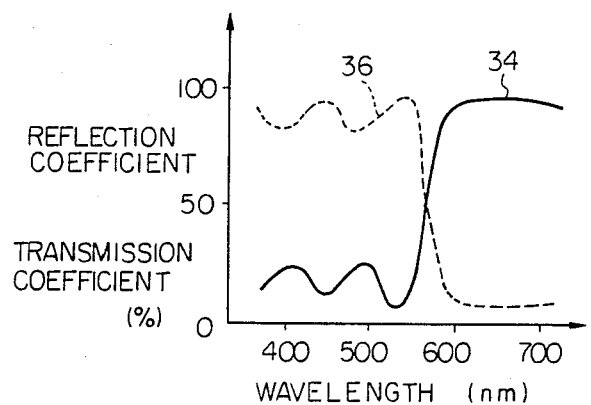
FIG. 5 is a graph showing the transmission and reflection characteristics of the dichroic reflector of the embodiment of FIG. 3.

FIG. 5 is a graph illustrating the transmission and reflection characteristics of a suitable dichroic mirror for a liquid crystal display device in accordance with the present invention. Numeral 34 indicates the reflection characteristic, while numeral 36 indicates the transmission characteristic.

For the embodiment of the present invention shown in FIG. 2, the liquid crystal molecules will immediately revert from the focal-conic static scattering mode to the Grandjean texture (i.e. the transparent state) immediately after the electric field is removed, i.e. when the voltage applied to electrodes 14 and 18 goes to zero, if the distance between substrates 10 and 12 is in the range of ¾ of a helix pitch to one helix pitch. For the mixture of positive dielectric anistropy nematic liquid crystal and cholesteric liquid crystal specifically described above for use in the embodiment of FIG. 2, a suitable spacing between substrates 10 and 12 is 10 μm, to meet the condition for immediate return to the transparent state when the applied electric field is removed. If the spacing between the substrates 10 and 12 is substantially greater than the length of a helix pitch, then a memory effect will occur in the liquid crystal, whereby a scattering state will persist for a short time after the electric field is removed. In this case, the liquid crystal layer 21 can be forced to change to the transparent nematic texture (homeotropic texture by applying a voltage of suitably higher value than the voltage which was applied to electrodes 14 and 18 to cause the scattering state to be entered. Alternatively, a restoration of the transparent state of liquid crystal layer 21 can be achieved by applying a high frequency voltage to electrodes 14 and 18.

It is possible to modify the embodiment of the present invention described above so as to provide a scattering state within the liquid crystal layer when no electric field is applied. In this case, the alignment layers cause the mixture of positive dielectric anisotropy nematic liquid crystal molecules and chiral material to attain a focal conic cholesteric texture, in which the helix axes are parallel to the substrate plane, in the absence of an applied electric field. Light passing through the liquid crystal is therefore scattered. When an electric field is applied between the device electrodes, the portion of the liquid crystal acted on by the electric field becomes arranged in the nematic texture, with the molecule axes arranged normal to the substrate plane. This portion of the liquid crystal will therefore pass light without scattering. In this case, when the electric field is removed, the liquid crystal will return to the scattering state within several hundred milliseconds.

Although the present invention has been shown and described with reference to particular embodiments, it should be noted that various other changes or modifications may be made without departing from the scope of the present invention.

What is claimed is:
1. A liquid crystal display device comprising:
   a first transparent substrate;
   a first transparent electrode formed on a surface of said first transparent substrate;
   a second transparent substrate;
   a partially reflecting dichroic mirror formed on a surface of said second transparent substrate;
   a second transparent electrode formed on a surface of said partially reflecting dichroic mirror;
   a first alignment layer formed over said first transparent electrode and over areas of said surface of said first transparent substrate outside areas which are covered by said first transparent electrode;
   a second alignment layer formed over said second transparent electrode and over areas of said partially reflecting dichroic mirror outside areas which are covered by said second transparent electrode;
   a layer of liquid crustal molecules consisting of a mixture of positive dielectric anisotropy liquid crystal molecules and chiral material, said first and second alignment layers acting in the absence of an electric field between said first and second transparent electrodes to align the longitudinal axes of molecules of said liquid crystal layer adjacent thereto in a direction parallel to the plane of said first and second substrates whereby said liquid crystal molecules attain a Grandjean texture, with the helix axes of said Grandjean texture being aligned substantially normal to said substrate plane, said liquid crystal layer being responsive to an electric field of predetermined strength between said first and second transparent electrodes for assuming a focal conic texture wherein incident light passing through said liquid crystal layer is scattered thereby; and
   diffusion reflection means arranged on the opposite side of said second transparent substrate to said layer of liquid crystal molecules.

2. A liquid crystal displa- device according to claim 1, wherein the spacing between said surface of said first transparent substrate having said first transparent electrode formed thereon and said surface of said second transparent substrate having said dichroic mirror formed thereon is in a range which extends from the length of one helix pitch of said Grandjean texture of said liquid crystal molecules to 0.7 of said length of one helix pitch.

3. A liquid crystal display device according to claim 1, wherein said layer of liquid crystal molecules consists of a mixture of about 99 to 80% by weight of said positive dielectric anisotropy nematic liquid crystal molecules and about 1 to 20% by weight of chiral material.

4. A liquid crystal display device according to claim 1, wherein a small proportion of negative dielectric anistropy nematic liquid crystal material is combined with said positive dielectric anisotropy nematic liquid crystal molecules.

* * * * *